Feb. 20, 1968    C. WEBER    3,369,821
CORE UNIT FOR SKIS
Filed June 8, 1965    2 Sheets-Sheet 1

INVENTOR
CHRISTINE WEBER
BY McGlew and Toren
ATTORNEYS

Feb. 20, 1968   C. WEBER   3,369,821
CORE UNIT FOR SKIS
Filed June 8, 1965   2 Sheets-Sheet 2
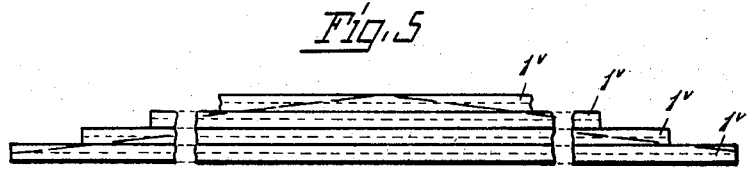
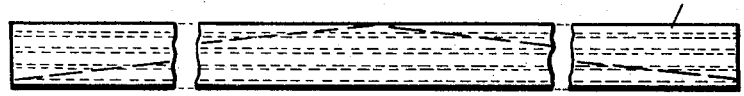
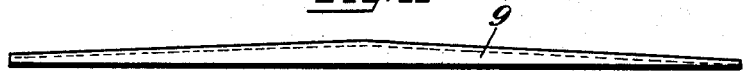
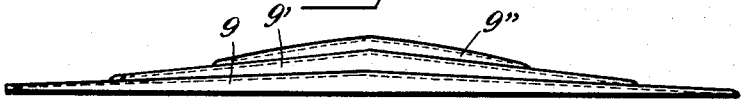
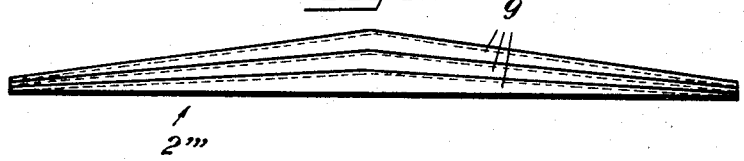
INVENTOR
CHRISTINE WEBER
BY
ATTORNEYS United States Patent Office 3,369,821
Patented Feb. 20, 1968

3,369,821
CORE UNIT FOR SKIS
Christine Weber, Innsbruck, Austria, assignor to Establishment Osheko, Schaanwalt, Mauren, Liechtenstein
Filed June 8, 1965, Ser. No. 462,270
Claims priority, application Austria, June 10, 1964,
A 4,965/64
18 Claims. (Cl. 280—11.13)

ABSTRACT OF THE DISCLOSURE

A core unit for laminated skis is disclosed as comprising a plurality of relatively thin and elongated prefabricated strips cut from extruded lengths of plastic composition material. These strips are laminated together in superposed relation to form the unit, and each of the strips has, as prefabricated, discontinuities therein to reduce the weight of the unit. The discontinuities are preferably in the form of alternating ribs and grooves extending longitudinally throughout the complete length of each strip.

Background of the invention

This invention relates to the manufacture of skis and, more particularly, to a novel core unit for laminated skis.

In the manufacture of laminated skis it is known to laminate, between the outer load bearing layers of a ski, a so-called "ski core" which generally has a double wedge-shaped or blunted triangular form in longitudinal elevation. The load supporting outer layers, such as the tread and sole layers, may be made, for example, of wood, light metal alloy, or glass fiber-reinforced plastic or synthetic resin laminates. As plastics or synthetic resins have found wide application in the manufacture of skis, it is natural that attempts have been made to make the core unit of plastic or synthetic resin material.

For example, it has been proposed to form the core unit, which is disposed between the two load carrying laminae of a ski, as a solid plastic or synthetic resin unit, and to form it with perforations extending normal to the laminae to reduce the weight. Although this concept is technically correct, it has the unfortunate practical disadvantage that the manufacture of such large plastic or synthetic resin parts is very difficult and costly, if not impossible, with the present state of plastic fabrication technology.

In view of this, it has been proposed to form a ski core unit in which individual strips of plastic or synthetic resin are adhered to ledges. These ledges are then joined together, in laterally spaced relation, to form the ski core, with the spaces between the ledges providing the desired saving in weight. However, even with this procedure, the manufacture of the core is relatively complicated since, in order to maintain proper spacings between the ledges, it is necessary to manipulate the same using templets or the like.

An object of the present invention is to provide a ski core unit free of the disadvantages of prior art units.

Another object of the invention is to provide a ski core unit comprising at least one laminated construction formed of bands or strips of plastic or synthetic resin material adhered to each other.

A further object of the invention is to provide a laminated ski core unit having recesses, cutouts, or the like for weight reduction.

Yet another object of the invention is to provide a laminated ski core unit, laminated of strips or bands of plastic or synthetic resin material, in which the strips or bands may be formed as extrusions.

Still a further object of the invention is to provide a laminated ski core unit consisting of bands or strips of plastic or synthetic resin laminated to each other, and formed with recesses, cutouts, or the like for weight reduction, and in which the individual laminations may be formed as extrusions.

For an understanding of the principles of the invention, reference is made to the following description of typical embodiments thereof as illustrated in the accompanying drawings.

In the drawings:

FIG. 5 is a side elevation view of a ski core unit embodying the invention, at an intermediate stage in its processing;

FIG. 7 is a side elevation view of another form of ski core unit, embodying the invention, at an intermediate stage in its processing;

FIG. 11 is a side elevation view of a lamina for a ski core unit embodying the invention, and in which the height of the lamina varies longitudinally thereof;

FIG. 12 is a plan view of another form of ski core unit lamina embodying the invention and in which the width of the lamina varies longitudinally thereof;

FIG. 13 is a side elevation view of a ski core unit formed of laminae such as shown in FIG. 11;

FIG. 14 is a partial perspective view of an extruded ski core lamina, in accordance with the invention, and in which the vertical cross section varies periodically longitudinally thereof; and FIG. 15 is a side elevation of a ski core unit formed of the laminae such as shown in FIG. 11 and in which the respective laminae are equal in length.

Figure 1:
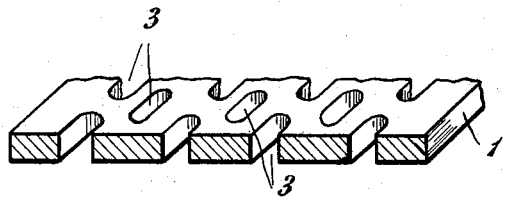
FIGS. 1 through 4 are partial sectional perspective views illustrating different configurations of laminae which may be used to form a ski core unit embodying the invention.

Referring to FIG. 1, a band or lamina 1, such as used for the production of a laminated core unit shown, for example, at 2 in FIG. 5, is formed of plastic or synthetic resin and is provided with slot-type discontinuities 3 for the purpose of lightening the weight of the unit. While the band 1 shown in FIG. 1 can be used in forming the core unit 2 of the invention, for practical purposes it is preferred to use laminae or bands which can be extruded as continuous lengths, and such bands or laminae are shown in FIGS. 2, 3 and 4.

Figure 2:
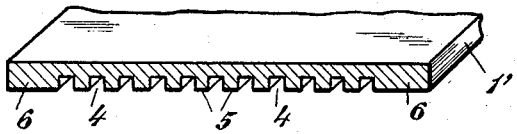
Figure 3:
Figure 4:
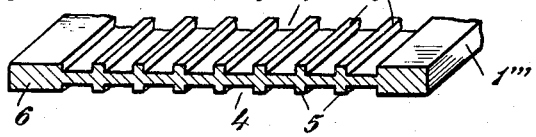

In each of the laminae shown in FIGS. 2, 3 and 4, the discontinuities for reducing weight are illustrated as comprising grooves 4 separated by ribs such as 5 or 5'. In FIG. 2, the lamina 1' is illustrated as having rectangular grooves 4 separated by rectangular ribs 5, with the outer surfaces of the ribs 5 lying in a common plane. In FIG. 3, the lamina 1" is shown as having triangular grooves 4 with trapezoidal ribs 5 whose outer surfaces likewise lie in a common plane. In FIG. 4, lamina 1''' is illustrated as having relatively wide rectangular grooves 4 separated by rectangular ribs 5, on one side of lamina 1''', and 5' on the other side of lamina 1'''. The outer surfaces of ribs 5 lie in a common plane, and the outer surfaces of ribs 5' lie in a common plane, and it will be noted that each rib 5 is directly aligned with a rib 5'. The various ribs 5 and 5' have their outer surfaces arranged in a common plane to facilitate adhering or laminating the individual laminae together properly and satisfactorily, and so that the laminae can be brought into surface-to-surface engagement and irrespective of the order in which various laminae are laminated together. In other words, there will always be surface-to-surface engagement between the outer surfaces of the ribs on one lamina and the outer surfaces of the ribs on the adjacent laminae on either side thereof.

It will be noted further, in each of FIGS. 2, 3 and 4, that the endmost ribs or full thickness lateral marginal areas 6 are very substantially wider than the ribs 5 or 5'. Preferably, the widths of the lateral marginal areas 6 are multiples of the widths of the individual ribs 5 or 5', and the purpose of this will be made clear hereinafter.

To produce a core unit, such as the core unit 2 shown in FIG. 5, for example, plural laminae are superposed and laminated or adhered together by the application of an adhesive, heat and/or pressure. The lengths of the several laminae are selected in accordance with the desired double wedge form of the ski core unit to be formed. Thus, in the arrangement of FIG. 5, a plurality of laminae $1^v$ are laminated together, with the uppermost lamina being relatively short and the laminae progressively increasing in length toward the bottom of the unit. When the packet has thus been formed and satisfactorily laminated together, the double wedge form of the core, as shown in broken lines in FIG. 5, is imparted to the packet by suitable procedures already known in the art.

Figure 6:
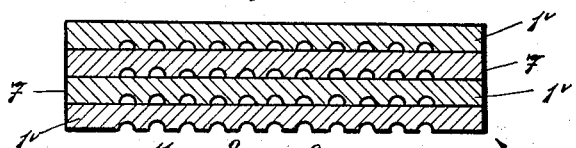
FIG. 6 is a transverse sectional view of the ski core unit shown in FIG. 5.

The laminated bands, which are shown in transverse section in FIG. 6 as laminated together, have, individually, uniform widths throughout their length. However, as the ski varies in width throughout its length, the core 2 must have its side surfaces machined or the like to adapt it to the desired contour of the ski. Consequently, as the various individual laminae 1', 1'', etc., have plane marginal areas 6 without grooves or the like, the lateral contour can be formed in the core unit without cutting into the areas of the laminae formed with the grooves 4. This is essential and important, inasmuch as the lateral surfaces 7 of the core unit are completely closed and therefore the core unit does not require a special covering to prevent penetration of moisture and the like.

Within the scope of the invention, extruded plastic or synthetic resin strips or laminae 8, provided with flutes, grooves or the like, may be laminated or adhered together to form a ski core unit 2' in such a manner that the interfaces between the adjacent laminae extend perpendicularly to the surfaces 11 arranged to have the outer load bearing laminae of the ski adhered thereto. In such case, the two outer marginal strips 8' are advantageously made of a thickness greater than that of the inner strips 8. Thus, in the marginal region of the core unit 2' there is sufficient solid material for shaping of the lateral contour of the ski. Such an arrangement is shown in FIGS. 7 and 8.

Figure 8:
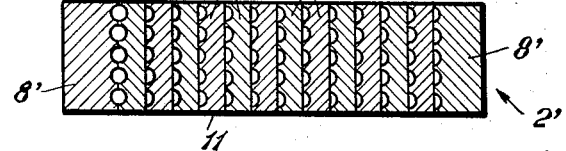
FIG. 8 is a transverse sectional view of ski core unit shown in FIG. 7.

In the arrangement shown in FIGS. 7 and 8, in addition, the widths of the strips 8 and 8' corresponds at least to the maximum thickness of the core unit. From the laminated strip packet 2' thus produced, the double wedge longitudinal contour, shown in broken lines in FIG. 7, is formed in a known manner. As stated previously, an important point is that the lateral ski contour is formed by unbroken or unslotted surfaces, to avoid the necessity for providing additional lateral coverings.

Figure 9:
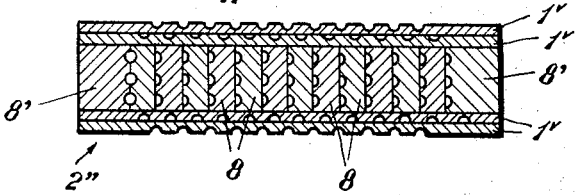
FIG. 9 is a transverse sectional view of another form of ski core unit embodying the invention.

FIG. 9 shows a modified form of core unit construction 2'' comprising strips 8, 8' and bands $1^v$. The arrangement of FIG. 9 is particularly advantageous when glue joints are to be avoided in the region of the neutral bending zone of the ski or of the ski core unit. It will be noted, in this arrangement, that the laminae 8, 8' extend perpendicularly to the upper and lower surfaces of the ski, whereas the laminae $1^v$ extend parallel thereto.

Figure 10:
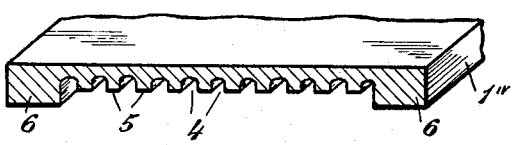
FIG. 10 is a view, similar to FIGS. 1 through 4, illustrating a special cross sectional shape of a lamina.

FIG. 10 illustrates a special form of lamina having grooves 4 separated by ribs 5. In the lamina $1^{IV}$ the plane marginal regions 6 are increased in depth so as to extend outwardly of the outer surfaces of the ribs 5, with the result that there is produced a lamina having an overall U-shaped profile. In this case, the inner lateral width of the U-shaped profile is made substantially less than the minimum ski width, so that sufficient material is provided at the lateral edges of the core unit for shaping of the lateral contours of the ski. A band or lamina of the type shown in FIG. 10 can advantageously be used as the bottom layer of a core unit 2', 2'', as a glass fiber laminate, a metal lamination, or the like can be adhered into the resulting trough as a reinforcement. Such a reinforcing lamination is not trimmed in forming the lateral contour of the unit, which is an advantage in saving wear, tear and stress on the forming tools which might result due to the hardness of the reinforcing laminae.

Lateral trimming of a core unit can be avoided by forming the individual laminae as shown in FIG. 12. In this case, the band elements or laminae have a width which varies throughout the length thereof and are narrowest adjacent their central region. Such bands or laminae can be formed as extrusions by corresponding control of the dies of the extrusion apparatus. Advantageously, various bands having different periodical width variations can be produced, so that specific contoured bands or laminae can be used for each core unit, thus resulting in a minimum waste of material. When laminae of the type shown in FIG. 12 are laminated together to form a core unit, they can be laminated simultaneously with the external load bearing laminae of the ski, such as the sole covering, the tread covering, etc., to form a complete ski.

FIG. 11 illustrates a band or strip type laminae which is thickest at its center and which tapers uniformly toward each end. In FIG. 11, the thickness of the band or laminae in comparison with its length is greatly exaggerated to illustrate the basic form. The undersurface of band or laminae 9 of FIG. 11 is formed with the grooves and ribs such as shown in FIGS. 1 through 4. As illustrated in FIG. 14, such as a band or laminae can be formed as a continuous extrusion 10 by the use of special control means for the extrusion dies.

A band 9, such as shown in FIG. 11, may have, for example, an end thickness of 0.5 mm. and a central thickness of 4–5 mm. In the thicker central portion, the grooves may be deeper than at the ends. The advantage of the design shown in FIG. 11 is that the laminating of the core can be effected simultaneously with the complete lamination of the ski. For example, four of these wedge-shaped units can be pressed in a molding press simultaneously with the sole and surface laminates or sole and surface coverings to form a complete ski in one single operation. This results in substantial labor saving as the laminae forming the core need not be laminated in a separate operation and, on the other hand, there is practically no waste of material.

Also, using this principle, extrusions 10 (FIG. 14) of different periodicity may be formed so that for each layer of the core, as shown in FIG. 13, different length laminae 9, 9' and 9'' can be used by laterally severing the respective extrusions 10.

FIG. 15 shows another embodiment of the invention in which the core unit 2''' is formed of a plurality of individual laminae or bands 9 of equal length and shaped as shown in FIG. 11. In this case, also, the wedge-shaped core can be laminated in the molding press simultaneously with lamination of the sole and surface laminae or coverings in order to form a ski in a single laminating operation.

As the narrow lateral outer surfaces of the core unit are particularly subject to external influences, such as wear or abrasions, the laminae preferably are manufactured in such a manner that they comprise a plastic or synthetic resin composition having a higher specific gravity at the lateral peripheries than in the central regions.

The laminae of the type shown in FIG. 11 furthermore may be produced from a foamed thermoplastic material so that the double wedge-shaped laminae becomes still lighter. Depending upon the degree of foaming or the density of the laminae, the grooves or the like provided for weight saving may be omitted either partially or wholly.

Suitable plastic or synthetic resin materials which may be used to form the laminates include cellulose acetobutyrate, cellulose acetate, acryl-butadiene-styrene, or like materials. The outer laminae forming the tread or sole surfaces of the ski may comprise, for example, textile materials if desired.

While specific embodiments of the invention have been shown and described in detail to illustrate the application of the principles of the invention, it will be understood that the invention may be embodied otherwise without departing from such principles.

What is claimed is:

1. A ski core unit comprising, in combination, plural relatively thin and elongated prefabricated strips cut from extruded lengths of plastic composition material, laminated together in superposed relation to form the unit; each of said strips having, as prefabricated discontinuities therein to reduce the weight of the unit.

2. A ski core unit comprising, in combination, plural relatively thin and elongated prefabricated strips cut from extruded lengths of plastic composition material, laminated together in superposed relation to form the unit; each of said strips having as prefabricated discontinuities extending longitudinally throughout the complete length thereof to reduce the weight of the unit.

3. A ski core unit comprising, in combination, plural relatively thin and elongated prefabricated strips cut from extruded lengths of plastic composition material, laminated together in superposed relation to form the unit, each of said strips having, as prefabricated discontinuities extending longitudinally throughout the complete length thereof to reduce the weight of the unit; said discontinuities comprising grooves prefabricated in at least one wider surface of each strip.

4. A ski core unit comprising, in combination, plural relatively thin and elongated prefabricated strips cut from extruded lengths of plastic composition material, laminated together in superposed relation to form the unit; each of said strips having as prefabricated discontinuities extending longitudinally throughout the complete length thereof to reduce the weight of the unit; said discontinuities comprising laterally alternating grooves and ribs prefabricated in at least one wider surface of each strip.

5. A ski core unit comprising, in combination, plural relatively thin and elongated prefabricated strips cut from extruded lengths of plastic composition material, laminated together in superposed relation to form the unit; each of said strips having, as prefabricated discontinuities extending longitudinally throughout the complete length thereof to reduce the weight of the unit; said discontinuities comprising laterally alternating grooves and ribs prefabricated in at least one wider surface of each strip; the spacing of the laterally outermost grooves from the lateral edges of the respective strip being a multiple of the spacing between adjacent grooves.

6. A ski core unit comprising, in combination, plural relatively thin and elongated prefabricated strips cut from extruded lengths of plastic composition material, laminated together in superposed relation to form the unit; each of said strips having, as prefabricated laterally alternating ribs and grooves prefabricated in its opposite wider surfaces extending throughout the complete length thereof to reduce the weight of the unit; the ribs on opposite surfaces being in longitudinal alignment with each other.

7. A ski core unit comprising, in combination, plural relatively thin and elongated prefabricated strips cut from extruded lengths of plastic composition material, laminated together in superposed relation to form the unit; each of said strips having, as prefabricated discontinuities therein and extending longitudinally throughout the complete length thereof, to reduce the weight of the unit; the widths of said strips corresponding to the maximum width of the ski.

8. A ski core unit comprising, in combination, plural relatively thin and elongated prefabricated strips cut from extruded lengths of plastic composition material, laminated together in superposed relation to form the unit; each of said strips having, as prefabricated discontinuities therein and extending longitudinally throughout the complete length thereof, to reduce the weight of the unit; the widths of said strips varying longitudinally thereof.

9. A ski core unit comprising, in combination, plural relatively thin and elongated prefabricated strips cut from extruded lengths of plastic composition material, laminated together in superposed relation to form the unit; each of said strips having as prefabricated discontinuities therein and extending longitudinally throughout the complete length thereof, to reduce the weight of the unit; the widths of said strips varying longitudinally thereof, said strips being narrowest at their midsections.

10. A ski core unit comprising, in combination, plural relatively thin and elongated prefabricated strips cut from extruded lengths of plastic composition material, laminated together in superposed relation to form the unit; each of said strips having, as prefabricated discontinuities extending longitudinally throughout the complete length thereof to reduce the weight of the unit; said discontinuities comprising laterally alternating grooves and ribs prefabricated in at least one wider surface of each strip; the spacing of the laterally outermost grooves from the lateral edges of the respective strip being a multiple of the spacing between adjacent grooves; the lateral marginal areas of at least one strip having a height greater than said ribs and having planar outer surfaces disposed outwardly of the plane including the outer surfaces of said ribs.

11. A ski core unit comprising, in combination, plural relatively thin and elongated prefabricated strips cut from extruded lengths of plastic composition material, laminated together in superposed relation to form the unit; each of said strips having, as prefabricated discontinuities therein and extending longitudinally throughout the complete length thereof, to reduce the weight of the unit; the thickness of said strips varying longitudinally thereof.

12. A ski core unit comprising, in combination, plural relatively thin and elongated prefabricated strips cut from extruded lengths of plastic composition material, laminated together in superposed relation to form the unit; each of said strips having, as prefabricated discontinuities therein and extending longitudinally throughout the complete length thereof, to reduce the weight of the unit; the thickness of said strips varying longitudinally thereof, and said strips being thickest at their midsections.

13. A ski core unit comprising, in combination, plural relatively thin and elongated prefabricated strips cut from extruded lengths of plastic composition material, laminated together in superposed relation to form the unit; each of said strips having, as prefabricated discontinuities therein and extending longitudinally throughout the complete length thereof, to reduce the weight of the unit; the thickness of said strips varying longitudinally thereof; said strips having double wedge contours in side elevation.

14. A ski core unit comprising, in combination, plural relatively thin and elongated prefabricated strips cut from extruded lengths of plastic composition material, of cellulose acetobutyrate, cellulose acetate, or acryl-butadiene-styrene, laminated together in superposed relation to form the unit; each of said strips having discontinuities prefabricated therein and extending longitudinally throughout the complete length thereof, to reduce the weight of the unit.

15. A ski core unit comprising, in combination, plural relatively thin and elongated prefabricated strips cut from extruded lengths of plastic composition material, laminated together in superposed relation to form the unit; each of said strips having, as prefabricated discontinuities extending longitudinally throughout the complete length thereof to reduce the weight of the unit; said discontinuities comprising laterally alternating grooves and ribs prefabricated in at least one wider surface of each strip; the spacing of the laterally outermost grooves from the lateral edges of the respective strip being a multiple of the spacing between adjacent grooves; the lateral marginal areas of at least one strip having planar outersurfaces disposed outwardly of a plane including the outer surfaces of said ribs; the inside width of the resulting U-shaped cross section being less than the minimum width of the ski.

16. A ski core unit comprising, in combination, plural relatively thin and elongated prefabricated strips cut from extruded lengths of plastic composition material, of plastic material laminated together in superposed relation to form the unit, each of said strips having, as prefabricated discontinuities therein extending longitudinally throughout the complete length thereof, to reduce the weight of the unit; the plastic composition of said strips having a higher specific gravity adjacent the lateral edges of the strips than at the central regions of the strips.

17. A ski core unit comprising, in combination, plural relatively thin and elongated prefabricated strips cut from extruded lengths of plastic composition material, laminated together in superposed relation to form the unit; each of said strips having, as prefabricated discontinuities therein extending longitudinally throughout the complete length thereof, to reduce the weight of the unit; all of said strips having the same length.

18. A ski core unit comprising, in combination plural relatively thin and elongated prefabricated strips cut from extruded lengths of plastic composition material, laminated together in superposed relation to form the unit; each of said strips having, as prefabricated discontinuities therein extending longitudinally throughout the complete length thereof, to reduce the weight of the unit; said strips progressively increasing in length from one longitudinal surface of said unit to the other longitudinal surface thereof.

References Cited
UNITED STATES PATENTS

| | | | |
|---|---|---|---|
| 2,184,791 | 12/1939 | Broome | 280—11.13 |
| 2,595,734 | 5/1952 | Toulmin | 161—116 |
| 2,798,258 | 7/1957 | Allan et al. | 161—116 |
| 3,003,599 | 10/1961 | Rubisson | 161—116 |
| 3,132,874 | 5/1964 | Baudou | 280—11.13 |

FOREIGN PATENTS

| | | |
|---|---|---|
| 182,660 | 7/1955 | Austria. |
| 218,935 | 12/1961 | Austria. |
| 985,174 | 3/1951 | France. |
| 1,351,207 | 12/1963 | France. |
| 662,635 | 12/1951 | Great Britain. |
| 54,629 | 11/1934 | Norway. |
| 110,143 | 3/1944 | Sweden. |

BENJAMIN HERSH, *Primary Examiner.*

MILTON L. SMITH, *Examiner.*